United States Patent [19]
Curtet

[11] Patent Number: 5,903,486
[45] Date of Patent: May 11, 1999

[54] DEVICE FOR DIGITALLY CARRYING OUT A DIVISION OPERATION

[75] Inventor: Joël Curtet, Fontaine, France

[73] Assignee: SGS-Thomson Microelectronics S.A., Saint Genis, France

[21] Appl. No.: 08/944,707

[22] Filed: Oct. 6, 1997

Related U.S. Application Data

[63] Continuation of application No. 08/737,814, filed as application No. PCT/FR95/00655, May 18, 1995, abandoned.

[30] Foreign Application Priority Data

May 20, 1994 [FR] France .................................. 94 06214

[51] Int. Cl.⁶ ...................................................... G06F 7/52
[52] U.S. Cl. ............................................ 364/766; 364/767
[58] Field of Search ........................ 364/748.1, 761–766, 364/767

[56] References Cited

U.S. PATENT DOCUMENTS

| | | | |
|---|---|---|---|
| 3,492,468 | 1/1970 | Frye ............................................ | 235/164 |
| 4,181,934 | 1/1980 | Marenin ...................................... | 364/200 |
| 4,320,464 | 3/1982 | Desmonds ................................... | 364/766 |
| 4,339,793 | 7/1982 | Marenin ...................................... | 364/200 |
| 4,378,589 | 3/1983 | Finnegan et al. ........................... | 364/200 |
| 4,381,550 | 4/1983 | Baker ......................................... | 364/766 |
| 5,016,210 | 5/1991 | Sprague et al. ............................ | 364/766 |
| 5,258,944 | 11/1993 | Smith ........................................ | 364/748 |
| 5,317,531 | 5/1994 | Zaidi ......................................... | 364/766 |
| 5,404,324 | 4/1995 | Colon-Bonet .............................. | 364/761 |

OTHER PUBLICATIONS

*International Search Report*, from PCT/FR95/00655, filed May 18, 1995.
*Non–Recovery Type Divider*, patent abstract of Japan, published Jun. 25, 1990.

Primary Examiner—Emmanuel L. Moise
Attorney, Agent, or Firm—Wolf, Greenfield & Sacks, P.C.

[57] ABSTRACT

A device for the digital performance of a binary division according to a non-restoring type of division method chiefly comprises a circuit for the detection of null partial remainders during the division. Advantageously, combinational circuits are designed to compute a correction bit to correct the quotient in a single instruction. Finally, there is advantageously provided a circuit for the computation, at each division step, of the complemented quotient bit for the next division step and a multiplexer for the introduction, at the next step, of the reverse of this complemented quotient bit on the least significant position of the quotient. Application to signal processors.

4 Claims, 2 Drawing Sheets

DEVICE FOR DIGITALLY CARRYING OUT A DIVISION OPERATION

This application is a continuation of application Ser. No. 08/737,814, filed Nov. 19, 1996, ABD, which is 371 of PCT/FR95/00655 filed on May 18, 1995.

BACKGROUND OF THE INVENTION

1. Field of the Invention

The invention relates to a device for the digital performance of a operation of division adapted to a non-restoring type of method (namely a method with non-restoring of partial remainders). It can be applied more particularly to the computation of the binary division operations of integer or fractional numbers (fixed point). It can be applied especially to digital signal processors.

2. Description of the Prior Art

The computation of binary division operations uses chiefly operations of comparison and subtraction. It should be furthermore take account of a certain number of problems such as the format of the operands (whether fractional or integer), the sign of the result, the unexpected occurrence of null partial results which may lead to an invalid result, etc. In general, a register which shall be called an accumulator is used for the dividend and a source register is used for the divider. The register used for the dividend, namely the accumulator, then contains, for each division step, on the most significant bits, the computed remainder and on the least significant bits, the computed quotient.

To enable the processing, without distinction, of integer or fractional formats whether signed or unsigned, a division approach known as that of non-restoring of partial remainders is used. This approach is based on the sign of the result of subtraction or addition of the partial remainder and of the divider. As its name indicates, it is possible that the partial results may not be accurate: for a given division step, if the quotient bit computed in the previous step is null, then since the divider will have been subtracted all the same, the divider should be added to the partial remainder to recover the correct partial remainder.

For each step of the division, it is necessary to compute the new quotient and the new partial remainder.

Several implementations of the algorithm in a computation device are possible. The invention is concerned particularly with a mode of implementation using the same register containing, at the outset, the dividend to memorize the successive partial remainders and the quotient throughout the division. The remainder is memorized on the most significant bits and the quotient on the least significant bits. This implementation includes the following successive operations for each division step i:

- the shifting of the register containing the partial remainder and the quotient by one position leftwards;
- the introduction of the reverse of the complemented quotient bit computed at the previous step i−1 on the rightmost position of the register;
- the computation of the partial remainder by the addition or subtraction of the divider aligned on the most significant bits of the register, according to the binary value of the complementary quotient bit computed at the step i−1 of the previous division;
- the computation of the complemented quotient bit for the next i+1 step, as a function of the sign of the new partial remainder and of the sign of the divider.

This process continues until n shifts have been made, in assuming the divider has a n magnitude bits and that it is desired to obtain a quotient of n magnitude bits.

However, this algorithm entails the assumption that a certain number of conditions are verified so that the final quotient is accurate.

In particular if, during a division step, there is a null partial remainder, the quotient obtained after the last division step may be false. Indeed, a null number is considered to be positive. For a binary division, the sign of the remainder from a division step i is compared with the sign of the divider. It can be seen therefore that, if the divider is negative, the null remainder that is interpreted as being positive is wrongly interpreted, leading to an addition of the divider and not to a subtraction at the next division step. The final quotient is therefore false. It is corrected by adding a 1 to it on the least significant position.

Furthermore, it cannot be certain that a null partial remainder will be detected, for the remainder and the quotient have a variable size: at each division step, the remainder loses one magnitude bit while the quotient gains one. They are therefore operands whose size is variable as a function of the division step. Since they are in the same register, a complex circuitry is needed to follow the progress of the size of the remainder as a function of the division step and to determine the number of bits on which the zero detection has to be done.

Among other conditions, it is also necessary for the dividend to be smaller in terms of absolute value than the divider. If not, the division is not possible. In a signed division, it is also necessary to know whether the divider and the dividend have the same sign or opposite signs, in order to add or not add a unit on the least significant position of the quotient and correct the quotient accordingly when the divider and the dividend have opposite signs.

It is therefore necessary to treat different conditions to obtain the right result. This is achieved by means of so-called exceptional routines given or to be written by the user according to the needs of his application (format, size of the numbers to be processed). Apart from the fact that these routines are costly in terms of time, it is also possible that they do not process every case properly for want of following the division step by step. They are performed beforehand to ascertain that the division is possible or afterwards, to correct the quotient obtained if necessary.

To simplify the implementation of the algorithm, notably the problem of null partial remainders, certain manufacturers of these computation devices have limited the format of the operands at input. For example, certain devices work only on positive operands or only on positive dividers. There is no longer the problem of negative dividers. However, other routines are needed to test the signs and memorize them and to transform the negative operands into positive operands before the computation, and a routine is needed to give the quotient its right sign after the computation.

These manufacturers have also designed one register for the remainder and one register for the quotient to facilitate the detection of the null partial remainder. This approach however complicates the management of these registers for the division.

All these choices of registers, exceptional routines, correct formatting and correction of the quotient increase the number of instruction cycles and hence the computation time. And if it is desired to have a final remainder that is accurate, it is again necessary to carry out processing operations for different conditions to find out if this remainder is accurate and to correct it if necessary.

SUMMARY OF THE INVENTION

An object of the invention is a computation device comprising circuits to detect a null remainder during division.

As claimed, the invention relates to a device for the digital implementation of a division operation according to a non-restoring type of division method, comprising an arithmetic and logic unit to compute the partial remainders, wherein said device comprises a circuit for the detection of a null partial remainder during the division.

According to the invention, with the divider having an n-bit format, the partial remainder has a format on p bits, with $p \geq n$, aligned on the most significant bits of an accumulator register. The testing of the partial remainder at the division step i is done after the addition to or subtraction of the divider, aligned on the n most significant bits of the remainder, from the contents of the accumulator. The test consists in testing to find out whether the n most significant bits of the new remainder having positions $(p-n)$ to $(p-1)$ and the next least significant bit having the position $(p-1-n)$ are all null, in order to position an information bit at 1 if it indicates a partially null remainder or else to position it at 0 and, if this information bit is already positioned at 1, in testing only the bit having the position $(p-1-n)$ to keep the information bit at 1 if it is null or, if the contrary is the case, to reset it at zero.

The term "partially null remainder" means that only the following is known: the tested most significant bits of the partial remainder computed at the division step i are null and the testing of the bit with the position $(p-1-n)$ at the next division steps makes it possible to verify, as and when the contents of the accumulator register are shifted leftwards, that the other bits of the partial remainder of the step i, which has been found to be partially null, are also null, then making it possible to find out whether the partial remainder of the step i was really entirely null.

Another object of the invention is to take the different conditions of correction of the quotient into account at only one stroke. According to the invention, the device comprises combinational circuits to compute a correction to be applied to the quotient at the end of the division.

According to the invention, this correction is advantageously applied to the carry input of the arithmetic and logic unit.

Another object of the invention is the computation, at each division step, of the quotient bit complemented for the next division step to introduce it, by means of a multiplexer at input of the arithmetic and logic unit, into the least significant bit of the quotient.

BRIEF DESCRIPTION OF THE DRAWINGS

Other features and advantages are presented in the following description, given by way of a non-restricted example of the invention and with reference to the appended drawings, of which.

MORE DETAILED DESCRIPTION

Figure 1:
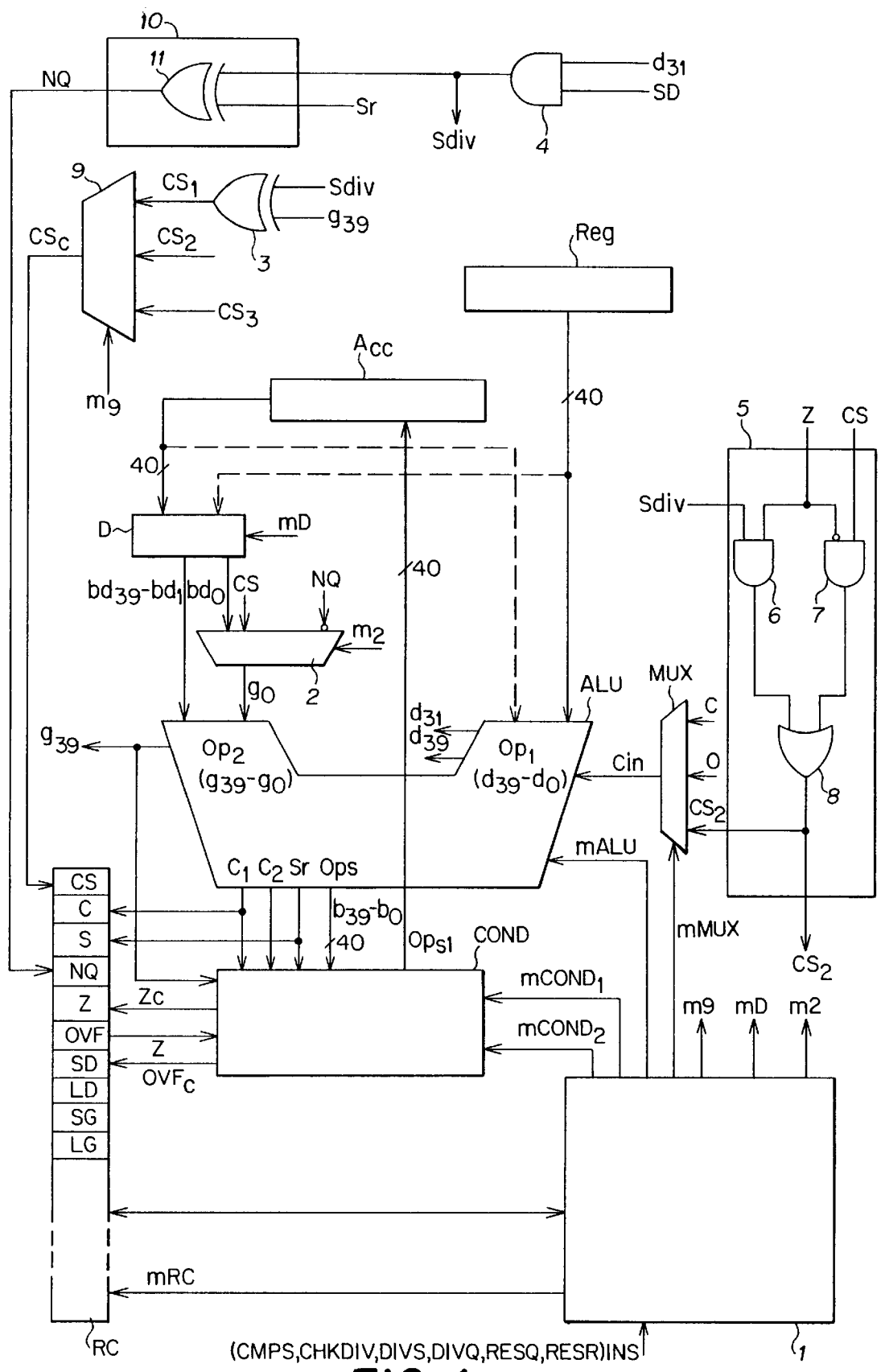
FIG. 1 shows a block diagram of a device for the implementing of a binary division according to the invention.

A block diagram of a computation device according to the invention is shown in FIG. 1.

It has chiefly an arithmetic and logic processing unit ALU controlled by a control unit 1. In the example shown, there is a 40-bit computation device, the 40 bits comprising 32 significant magnitude bits and 8 extension bits.

The operands at input of the arithmetic and logic unit thus have 8 extension bits set at zero in unsigned representation or taking the sign bit in signed representation. The sign bit of the operands in the arithmetic and logic unit is therefore given by the bits in the positions 31 to 39 (for positions going from 0 to 39).

The arithmetic and logic unit has two inputs $Op_1$ and $Op_2$ to respectively receive a right-hand operand and a left-hand operand and an output $Op_s$ to give the result of an arithmetic or logic operation.

The operands may be of the signed or unsigned type and have a long format (32 magnitude bits) or short (16 magnitude bits).

The type and format of the operands which influence the computation operations in the arithmetic and logic unit are defined in a condition register RC:

SG for the signed (1) or non-signed (0) type of the left-hand operand and SD for the right-hand operand.

LG for the long format (1) or short format (0) of the left-hand operand and LD for the right-hand operand.

For a short format, the operands are aligned to the left, namely the most significant bit of the number is on the bit with the position 31 (with the convention already seen), the 16 least significant bits being complemented by zeros and the 8 extension bits with the sign bit or with zeros.

The arithmetic and logic unit also delivers arithmetic information elements, namely the two most significant carry bits $C_1$ and $C_2$ and the sign bit Sr of the result. The information bits $C_1$ and Sr are given at the end of the computation to the condition register RC. In the example, the bit $C_1$ is applied to the carry bit C of this register and the bit Sr is applied to the sign bit S. The bits C and S represent, at a given point in time, information elements on the last result computed. $C_1$, $C_2$ and Sr are also applied to a conditional circuit COND that delivers other information bits to the condition register RC, including a bit Z indicating that the 32 significant bits of the result at output of the arithmetic and logic unit are null and a capacity overflow bit $OVF_C$ indicating that the result has overflowed the format used. This conditional circuit gives, at an output $Op_{s1}$, the result computed by the arithmetic and logic unit or else, in the event of detection of an overflow, a saturated value corresponding to the maximum or to the minimum of the format. In the invention, this conditional circuit also receives, as information bits, the sign bit of the left-hand operand, $g_{39}$ in the example. This conditional circuit according to the invention is given in greater detail further below with reference to FIG. 2.

According to the invention, the bit Z has another significance in division: it is the information bit of the partially null remainder computed by this same condition circuit COND as shall be seen further below.

The operands are given to the arithmetic and logic unit by source registers. In the example, the left-hand operand is given by an accumulator Acc which is also a destination register of the output of the arithmetic and logic unit through the conditional circuit COND (output Ops1). The right-hand operand is given by a source register referenced Reg.

According to the invention, between the source registers and the input $Op_2$ of the arithmetic and logic unit, there is a shifter D and a multiplexer 2. This shifter D is preferably a barrel register and enables the application of an arithmetic or logic shift, to the right or to the left and by any number of positions, of the contents of a source register before applying it to an operand input of the arithmetic and logic unit, this input being the left-hand operand input in the example. In the invention, it could also be a more simple shifter enabling the obtaining of at least one shift by one position towards the left.

The output bits of this shifter, referenced $bd_0$–$bd_{39}$, are applied to the bits $g_0$–$g_{39}$ of the left operand input $Op_2$. More specifically, the bits $bd_1$–$bd_{39}$ are applied directly to the corresponding bits of the left-hand operand. According to the invention, the bit $bd_0$ is applied to the input of the logic multiplexer 2 which receives, as other inputs, a sign comparison bit CS and a complemented quotient bit NQ coming from the condition register RC. This multiplexer delivers a bit at output applied to the bit $g_0$ of the left-hand operand.

According to the invention, to carry out a division, the dividend is placed in the accumulator at the input of the arithmetic and logic unit with the shifter, the left-hand operand input in the example, and the divider is placed in the source register at the other operand input, the right-hand operand input in the example.

According to the invention, the sign comparison bit CS of the condition register RC comes from different conditional circuits used for the division and, depending on the division step concerned, may represent a bit resulting from the comparison of the signs of the dividend and the divider or a bit of correction of the quotient.

A first conditional circuit 3 delivers a first bit $CS_1$ indicating whether the signs of the divider (right-hand operand) and of the dividend (left-hand operand) are different ($CS_1=1$) or not different ($CS_1=0$) and which will be used to determine the first bit of the quotient (sign bit) and compute the correction, if any, of the quotient. In an exemplary embodiment represented in FIG. 1, this circuit 3 is constituted by an Exclusive-OR logic gate that receives, at input, the sign bit of the left-hand operand (dividend) and the sign bit of the right-hand operand (divider). At output, it delivers the first sign comparison bit referenced $CS_1$. In the example chosen of a computation device with extension bits, the sign bit is given, for a signed number, by the most significant bit (herein the bit with position 31) and all the extension bits (which are copies of this bit 31). In the case of an unsigned number, the sign is necessarily positive and the most significant bit (having the position 31) no longer represents the sign, but a magnitude of the number represented, the number being then extended up to the bit 39 with zeros. Thus, if it is desired to position the bit $CS_1$ accurately in every case, an extension bit is chosen, for example the bits having the position 39 of the left-hand operand and right-hand operand. It is also possible to carry out a logic AND operation between the type, whether signed or not, of the operand and the bit with the position 31 to obtain the true sign of the operand in every case. In the example shown, the sign bit of the dividend is given by the bit $g_{39}$ of the left-hand operand and the sign bit of the divider, referenced Sdiv, is given at output of an AND gate 4 which receives the SD type bit from the condition register indicating whether the right-hand operand is signed or not and the bit $d_{31}$.

According to the invention, a second conditional circuit 5 delivers a second bit $CS_2$ that represents the correction to be applied to the quotient at the end of the division.

In the example, it has three logic gates 6, 7 and 8. At input, it receives the bits Z, CS and the bit Sdiv which, as has been seen, indicates the sign of the divider, irrespectively of its type, whether signed or unsigned. The bit Z represents, in this case, the information bit of the partially null remainder according to the invention.

The gate 6 is a logic AND gate that receives this bit Z and the sign bit Sdiv of the divider as inputs.

The gate 7 is a logic AND gate that receives the same bit Z on an inverter input and the sign comparison bit CS of the register RC on a normal input.

The gate 8 is an OR gate that receives the outputs of the preceding gates 6 and 7 as inputs. It delivers a logic output bit which is the second bit $CS_2$ for the correction of the quotient.

A third bit $CS_3$ is provided, enabling the control unit 1 to carry out a direct writing of whether the dividend and the divider are of the same sign or not, instead of the circuit 3 (this being so in the case where the sign of the divider and of the dividend are known beforehand).

The three bits $CS_1$, $CS_2$ and $CS_3$ are applied to a multiplexer 9 whose output enables the switching over of either bit to the bit $CS_C$ which is memorized in the bit CS of the condition register RC.

The arithmetic and logic unit also receives a bit Cin that enables the application or non-application of a carry value to the bit with the least significant position. In general, as shown, a multiplexer Mux receives at input the carry bit C of the condition register and a bit enforced to zero to apply either input depending on whether the operations are performed with or without a carry operation in the arithmetic and logic unit.

According to the invention, a supplementary input is designed on the multiplexer Mux to receive the correction bit $CS_2$ computed by the above-described conditional circuit 5.

Finally, the complemented quotient bit NQ of the condition register is given by a conditional circuit 10 that compares the sign of the divider with the sign of the remainder (after the operation for the subtraction or the division of the divider). The sign of the divider is given, as seen already, by the bit Sdiv and the sign of the remainder concerned here, is given by the sign bit of the result computed by the arithmetic and logic unit, namely the bit Sr, generally corresponding to the bit with the position 39 of the result ($b_{39}$).

In the example shown in FIG. 1, the circuit 10 has an Exclusive-OR (XOR) gate 11 that receives the bit Sdiv and the bit Sr as inputs. The output of this gate 11 gives the complemented quotient bit that is memorized in the bit NQ of the condition register RC.

Figure 2:
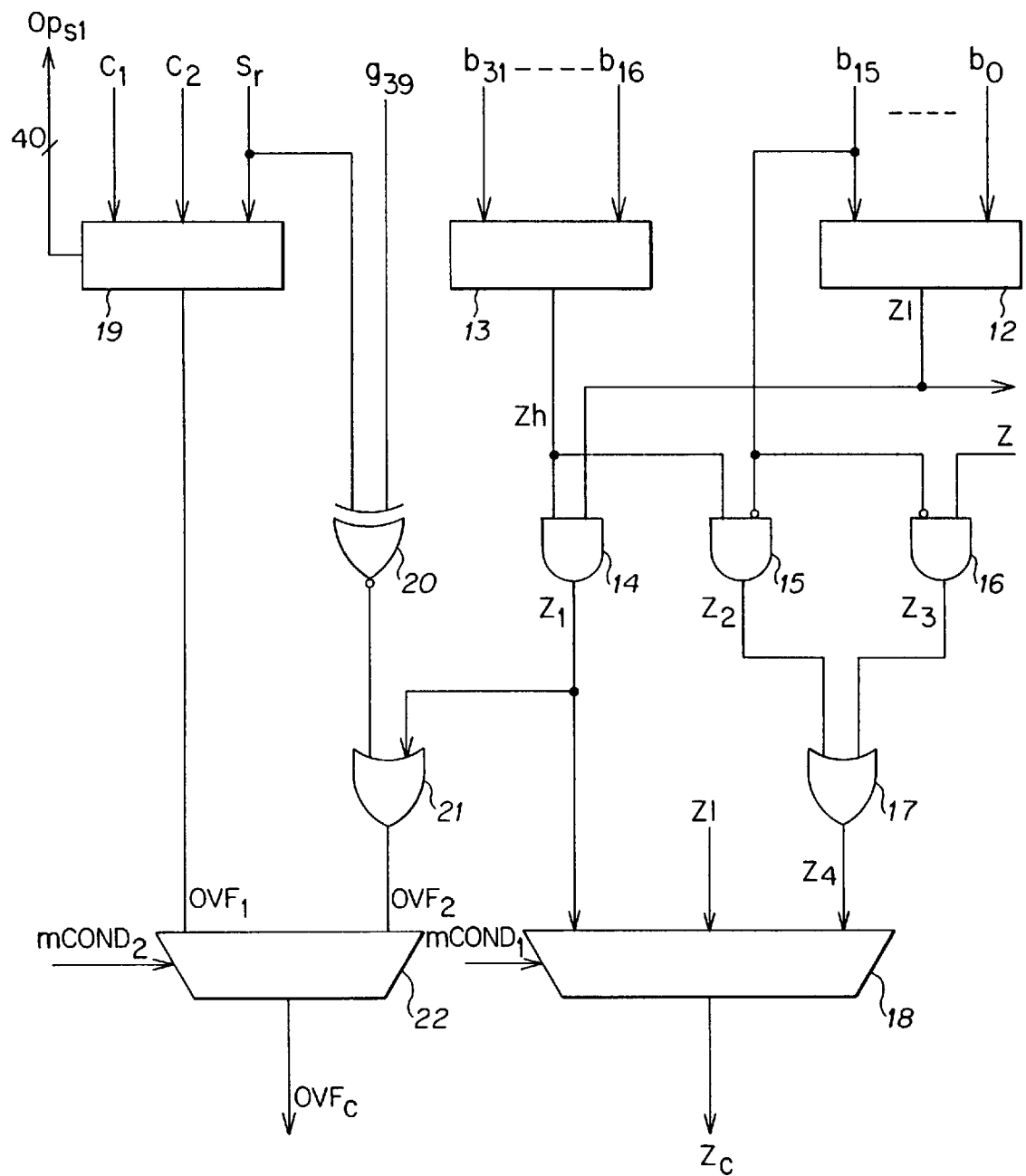
FIG. 2 shows a block diagram of the function of detection of null partial remainders according to the invention.

The conditional register COND according to the invention shall now be described in detail with reference to FIG. 2. It has a first part comprising circuits 12 to 18 to set the bit Z representing either a null result or else the information relating to the partially null remainder according to the invention and a second part comprising circuits 19 to 22, to set the bit OVF representing either an overflow or an impossible division according to the invention.

The first part receives the 16 least significant bits $b_0$–$b_{15}$ on a first zero comparison circuit 12 that gives an output bit Zl equal to 1 if all the input bits are equal to zero, or else it gives an output bit Zl equal to 0. The 16 next bits $b_{16}$ to $b_{31}$ are applied to the input of a second zero comparison circuit 13. It delivers an output bit Zh equal to 1 if all the input bits $b_{16}$ to $b_{31}$ are equal to zero, or else it delivers an output bit Zh equal to 0. The circuits 12 and 13 are made simply by means, for example, of four NOR gates, one for 4 bits, followed by an AND gate with four inputs (not shown).

The two bits Zh and Zl are applied as inputs to a logic AND gate 14 which delivers a first bit $Z_1$ that indicates whether the significant bits $b_0$ to $b_{31}$ of the result computed by the arithmetic and logic unit are all null ($Z_1=1$) or not ($Z_1=0$).

According to the invention, the conditional circuit prepares another bit $Z_4$ by means of logic circuits 15 to 17.

A logic AND gate 15 receives the bit Zh on one input and the bit $b_{15}$ on an inverter input. It delivers a logic output $Z_2$ equal to 1 if the bits $b_{15}$ and $b_{16}$ to $b_{31}$ are all null, or else it delivers a logic output $Z_2$ equal to zero.

A logic AND gate 16 receives, at one input, the bit Z of the condition register RC and receives, on an inverter input, the bit $b_{15}$ of the result at output of the arithmetic and logic unit. It delivers a logic output $Z_3$ applied as an input of an OR gate 17 which receives, at a second input, the output $Z_2$ of the gate 15. The gate 17 delivers, at output, a result bit, enforced to 1 if the bits $b_{15}$ and $b_{16}$ to $b_{31}$ are null or if the bit Z of the condition register is equal to 1 and bit $b_{15}$ is null. If not, the bit $Z_4$ is equal to zero.

Finally, the output Z1 of the first comparison circuit 12 is also used to indicate whether the result quotient of the division expressed on the 16 least significant bits is null or not, thus making it possible as shall be seen to correct the remainder of the division. These three bits $Z_1$, $Z_4$ and Z1 are applied to the input of a multiplexer 18 that controls the state of the bit $Z_C$ which is stored in the bit Z of the condition register RC.

The conditional circuit furthermore comprises a saturation circuit 19 which receives chiefly, from the arithmetic and logic unit, the most significant carry bits $C_1$ and $C_2$ and the sign bit Sr to find out if there is an overflow, and gives a corresponding information bit $OVF_1$ and possibly gives a corresponding saturated value at output ($Op_{s1}$).

According to the invention, it also has a logic circuit to find out whether the division of a dividend and a divider presented at input of the arithmetic and logic unit is possible or not, i.e. whether the absolute value of the dividend is strictly lower than the absolute value of the divider (assuming that the numbers are expressed in the fractional format). It consists in finding out whether the result of a subtraction, if the two operands have the same sign, or the result of an addition if they have opposite signs, is strictly negative or not.

In the example, it comprises a first Exclusive-NOR type logic gate 20 which receives, at input, the bits Sr of the result at output of the arithmetic and logic unit which has performed the addition or the subtraction and the sign bit of the left-hand operand, in the example $g_{39}$ and a second logic gate 21 of the OR type that receives, at input, the output of the gate 20 and the first bit $Z_1$ which indicates a null result. The output of the gate 21 gives an information element $OVF_2$ which, if it is equal to 1, indicates that a division of the left-hand operand by the right-hand operand is not possible, the dividend being not strictly smaller than the divider (in terms of absolute value).

A multiplexer 22 is planned for the switching over of either bit ($OVF_1$) or ($OVF_2$) to the bit $OVF_C$ which is memorized in the bit OVF of the condition register RC.

All the different circuits described are controlled by the control unit 1 as follows:
 the arithmetic and logic unit by a command mALU,
 the conditional circuit by a command $mCOND_1$ which controls the multiplexer 18 of the circuit for preparing the bit $Z_C$ and a command $mCOND_2$ which controls the multiplexer 22 of the circuit for preparing the bit $OVF_C$,
 the condition register RC by a command mRC that enables the control unit to write all or part of the previously described condition bits in this register,
 the shifter D by a command mD,
 the multiplexer 2 on the left-hand input of the arithmetic and logic unit by a command m2,
 the multiplexer Mux to apply a carry value to the arithmetic and logic unit by a command mMux,
 the multiplexer 9 to commute the bit $CS_C$ to the bit CS of the condition register by a command m9.

The control method for the device of the invention can then be described with a divider in the source register, on the right-hand operand, and the dividend in the accumulator, on the left-hand operand.

The control unit positions the bits SD and SG expressing the signed type of the right-hand and left-hand operands. It must be noted that it is enough to position one operand, for example that of the divider, for work can be done only on operands of the same type.

According to the representation of FIGS. 1 and 2, with a 40-bit arithmetic and logic unit, the 40 bits including 8 extension bits, the format of the operands is preferably as follows: the dividend is expressed on 32 bits according to the long format (long format bit LG positioned in the condition register).

The divider has a magnitude expressed on 16 bits. The short format bit LD is therefore positioned in the condition register. It is stored in the register Reg.

It is assumed that a signed division (SD=SG=1) is performed. Upon the command of the control unit, which has previously read the bits SD, LD, SG and LD, the dividend is loaded into the left-hand input of the arithmetic and logic unit with the sign bit on the bit with the position 31 and with extension of the sign on the bits 32 to 39. The divider is loaded into the right-hand input of the arithmetic and logic unit, on the 16 most significant bits 16 to 31 with the 16 least significant bits (position 0 to 15) set at zero (short format). The sign is extended to the bits having the positions 32 to 39 (signed type).

According to the invention, if the respective sign of the operands (dividend and divider) is not known, a first instruction for the comparison of the sign is performed, the aim of this instruction being to determine whether the operands have the same sign or not. The control unit therefore receives a sign comparison instruction CMPS that activates a multiplexer 9 (command m9) to make it switch the output $CS_1$ over to the output $CS_C$ of the multiplexer. The bit $CS_1$ is given by the Exclusive-OR gate that processes the signs of the operands. If the signs of the operands is known, the control unit may switch the bit $CS_3$ over to the bit $CS_c$. The bit $CS_c$ is then memorized in the bit CS of the condition register RC.

Then, it is ascertained that the division is possible. Indeed, to implement the non-restoring division algorithm, the absolute value of the dividend should be strictly below the absolute value of the divider (assuming the numbers to be expressed in the fractional format). According to the invention, the overflow bit OVF is used in the condition register to indicate an invalidity of the division, but is calculated differently for the division as already seen ($OVF_2$, circuits 20 and 21, FIG. 2).

The control unit which receives the corresponding instruction CHKDIV reads the previously positioned sign comparison bit CS of the condition register RC and, if its value is 1, indicating opposite signs of the operands, it orders the arithmetic and logic unit to add up the two operands and if its value is zero to subtract the divider (right-hand operand) from the dividend (left-hand operand). These operations are done without any output of the result to the accumulator which remains unchanged. Then, the control unit sends the multiplexer 22 of the conditional circuit COND a command $mCOND_2$ to switch the bit $OVF_2$ over to the bit $OVF_C$ which is memorized in the bit OVF of the condition register. We then have:

$$OVF_C = OVF_2 = !(Sr \oplus g_{39}) + Z_1$$

(the sign ! indicates that the complement has to be taken).

The bit OVF memorized in the register RC is therefore equal to 1 if the result on the bits 0 to 31 is null or if the sign of the result given by the bit Sr at output of the arithmetic and logic unit (and equal in practice to the bit $b_{39}$ of the result) and the sign of the dividend are identical.

If the division is possible (OVF=0), it is then possible to take the first division step. According to the invention, the first division step consists in computing the sign bit of the quotient, computing the new partial remainder (the first partial remainder) and computing the complemented quotient bit NQ for the next step. For this purpose, an instruction DIVS is used, this instruction being used only once to carry out the sign division. It can already be noted that the sign bit of the quotient, given by the bit CS, positioned by $CS_1$ or directly by the control unit, is known.

Upon reception of the instruction DIVS, the control unit carries out the following instructions:
  the sending of a command mD to the shifter so that it effects a one-position leftward shift of the contents of the accumulator (still constituting the dividend);
  the sending of a command m2 to the multiplexer 2 at input of the left-hand operand so that it switches the bit CS of the condition register to the bit having the least significant position of the left-hand operand. We therefore have, at the left-hand input of the arithmetic and logic unit, the dividend shifted by one bit leftwards with the bit CS on its bit $g_0$: the bit $g_0$ is the partial quotient of this first division step which represents the sign bit;
  the sending of a command mALU on the arithmetic and logic unit for a subtraction of the divider from the partial remainder if the bit CS is equal to zero, or for an addition if the bit CS is equal to 1, with a saving of the result in the accumulator. It may be recalled that the 16 bits of the divider having positional values of 0 to 15 are equal to zero (short format): only the bits having positional values 16 to 39 are affected by this operation. The bits having positional values 0 to 15 of the left-hand operand remain unchanged. The partial remainder has therefore been computed;
  the saving, in the condition register RC, of the complemented quotient bit NQ given by:

NQ=(Sdiv) XOR Sr, i.e. the sign bit in signed division (where SD=1) is given by the Exclusive-OR gate between the sign bit of the divider and the sign bit of the new partial remainder computed Sr (bit $b_{39}$);
  and finally, the sending of a command $mCOND_1$ on the multiplexer 18 of the conditional circuit to switch the partially null remainder bit $Z_4$ to the bit $Z_C$ which is memorized in the bit Z of the condition register RC, revealing an occurrence of a partially null remainder according to the invention, on this first division step.

It is then possible to go on to the next division steps. Once the division step for the computation of the sign bit of the quotient is done, it is necessary to compute the following bits of the quotient.

According to the invention, an instruction referenced DIVQ is used for this purpose. This instruction computes the new partial quotient, then the new partial remainder, then the complemented quotient bit NQ for the next step and finally memorizes the occurrence of a partially null remainder or the confirmation of a preceding partially null remainder.

Upon the instruction DIVQ according to the invention, the control unit then performs the following operations:
  the sending of a command mD to the shifter to shift the contents of the accumulator by one position leftwards, with a transfer to the left-hand operand;
  the sending of a command m2 to the multiplexer 2 to switch the reverse of the bit NQ of the condition register over to the least significant bit $b_0$ of the left-hand operand;
  the sending of a command mALU to the arithmetic unit to perform the subtraction or the addition of the divider with the left-hand operand thus computed, depending on the value 0 or 1 of the bit NQ of the condition register, with the saving of the result in the accumulator;
  the computing of the complemented quotient bit NQ in the condition register as seen above, for the next division step;
  the updating of the bit Z of the condition register with the information bit $Z_4$ pertaining to the partially null remainder according to the invention, by the sending of a switching command $mCOND_1$ to the multiplexer 18 of the condition circuit.

It may be recalled that, according to the invention, firstly a test is performed to find out whether the bits 15 and 16 to 31 which are the most significant bits of the partial remainder are all null in order to position the information relating to partially null remainder at 1 and, secondly, a test is performed on the bit 15, with the partially null remainder bit already positioned at 1, in order to find out, as and when the contents of the accumulator register are shifted leftwards, whether the other least significant bits of the partial remainder shifted gradually towards the most significant positions are also null If this is not the case, the partially null remainder information bit is reset at zero. In short, if, at the step i, a partially null remainder is found, a test is then carried out at each following step to find out if the least significant bit shifted to the bit 15 is null or not. If at a step i+k, a non-null bit 15 is found, it means that the remainder at the step i was not entirely null. In parallel with this test, at each step, testing is continued to find out if the new partial remainder computed is partially null or not. At the end of the division, the bit Z indicates whether there is a partial remainder that is entirely null or not. The detection is therefore done throughout the division with a memory of what happens and the detection is interpreted at the end of the division. Thus, a judicious check is done on the nullity of a variably sized operand. It will be noted that only one partially null remainder can occur during a division.

When a division step DIVS and fourteen division steps DIVQ have been carried out, the last instruction DIVQ therefore gives the final bit Z which shows whether there has been a partial null remainder or not.

What remains to be done then is to correct the partial quotient to obtain the final quotient. According to the invention, all the conditions for which it is necessary to add one unit to the least significant position are taken into account at only one stroke. According to the invention, the conditional circuit 5 is used to compute a representative accumulator bit $CS_2$ and the carry input Cin of the arithmetic and logic unit is used to add this bit $CS_2$ to the least significant position of the quotient, with a saving of the result in the accumulator. An exemplary embodiment of the conditional circuit has been described with reference to FIG. 1. The cumulative condition is given by:

$CS_2=(Sdiv.Z)+(!Z.CS)$.

This bit combines both cases where the quotient has to be corrected: namely the case where the dividend and the divider have opposite signs, which is given by the bit CS of the condition register and the case where the divider is negative and where there has been at least one entirely null partial remainder during the division. In this case, indeed, the partial remainder has been considered to be positive, leading to a bit NQ equal to 1, namely a bit in the partial quotient equal to zero at the next step. In fact, a null remainder should be considered as having the same sign as the divider and hence as introducing, for the next step, a bit in the quotient equal to 1 (NQ equals 0).

In both cases, the post-incrementation of the result corrects the quotient.

The control unit which receives the instruction to correct the quotient RESQ then carries out the following commands:

the sending of a command mD to the shifter D so that it loads, as the left-hand operand, the contents of the accumulator shifted leftwards by one position;

the sending of a command m2 to the multiplexer 2 so that it switches the reverse of the bit NQ to the least significant bit of the left-hand operand;

the sending of a command mMux to the multiplexer Mux to switch the bit $CS_2$ of the conditional circuit 5 over to the carry input Cin of the arithmetic and logic unit;

the sending of a command mALU to the arithmetic and logic unit so that it adds the carry to the left-hand operand and saves the result in the accumulator. The accumulator then has the right quotient, with the signed format, on the 16 least significant bits. The remainder is expressed on the other 24 bits;

the sending of a command m9 on the multiplexer 9 to switch the bit $CS_2$ into the bit CS of the condition register;

the sending of a command mCOND1 to the multiplexer 18 of the condition circuit 5 to switch the bit Zl over to the bit Z of the condition register, which then indicates whether the corrected quotient is null or not.

The instruction RESQ according to the invention therefore computes the new bits Z and CS. It will be observed that the bit CS is unchanged if there has not been any detection of a partial remainder. The bit Zl is equal to 1 if the 16 least significant bits (quotient) of the result of the operation in the arithmetic and logic unit are equal to zero.

This condition is used to correct the remainder when the quotient before the instruction RESQ comprises only ones and $CS_2$ is equal to 1: the corrected quotient is then equal to zero but the propagation of the carry means that the partial remainder is modified.

The updating of the bit CS with the bit $CS_2$ is also used to correct the partial remainder.

According to the invention, an instruction is carried out to correct the partial remainder RESR. The control unit performs tests on the bits CS, NQ and Z of the condition register. It has been seen that the bit Z is given by Zl and is used to correct an error due to the correction of the quotient.

The bit CS for its part contains the bit $CS_2$ for the correction of the quotient. The bit NQ for its part contains the last complemented quotient bit computed by the last instruction DIVQ (the instruction RESQ does not modify the bit NQ, the control unit sending no command mRC on the bit NQ to the condition register for this instruction).

If CS=NQ, the control unit does nothing.

If CS=0 and NQ=1, the control unit adds the divider to the partial remainder. For this operation, it advantageously switches the register Reg, containing the divider, to the shifter to which it sends a command mD for a leftward shift by one position to obtain twice the divider on the left-hand operand and sends the contents of the accumulator to the right-hand operand (dashed arrows).

If CS=1 and NQ=0, the control unit subtracts twice the divider from the accumulator. In the latter case, the control unit makes the arithmetic and logic unit compute the sum of the accumulator (the right-hand operand) and of the two's complement of twice the divider (left-hand operand) if Z=0 or the one's complement of twice the divider if Z=1 (indeed, in this case, the incrementation "+1" that exists in the computation of the two's complement has already been done in the instruction RESQ).

The result of the arithmetic and logic unit is then loaded into the accumulator but only for the 24 most significant bits. The quotient remains unchanged in the 16 least significant bits and the true remainder is then located in the 24 most significant bits.

The signed division that has just been explained with respect to the implementation device according to the invention relates to the operands using fractional formats. If the operands have the integer format then, after the sign comparison (CS), a one-position leftward shift of the dividend is done before computing the division. At the end of the division, the remainder will have to be interpreted as being the double of the true remainder.

On the contrary, the verification that the division is possible is done after the shifting of the dividend.

With regard to the unsigned division, there is no bit sign. It is nevertheless necessary, according to the invention, to carry out an instruction DIVS for the computation of the sign of the quotient to compute the first quotient bit. This instruction generates a first non-significant bit in the quotient. Then, it is necessary to carry out fifteen instructions DIVQ to compute the other bits of the quotient. There is therefore a supplementary instruction DIVQ. The quotient is now expressed on 17 bits but the bit having the position 16 which represents the sign bit is herein non-significant. The remainder is then represented by the 23 most significant bits.

The changing from the signed division mode to the unsigned division mode is done by modification of the bit SD of the condition register: SD=0 indicates that the divider is not signed and therefore that Sdiv=0. For the dividend, it is enough for the 8 extension bits to contain zeros.

In the case of the unsigned division, there is no difference regardless of whether the format of the operands is an integer format or a fractional format, which plays a role only in the ultimate interpretation of the result.

With the implementation device according to the invention and the different combinational and multiplexing circuits, each of the different instructions is advantageously performed in only one cycle. And a user no longer has to carry out exceptional routines to correct the result except in order to deal with the case where the division is impossible ($OVF_2$).

In an example of a signed division of fractional numbers, a signed division of 32 bits by 16 requires 18 elementary instructions (CMPS, CHKDIV, DIVS, 14 times DIVQ, RESQ), plus possibly one instruction if the remainder has to be corrected, if this is necessary, for other computations (it is also necessary to add an instruction to initialize the loop counter DIVQ). The quotient is expressed ultimately on 16 bits.

It is possible of course to choose fewer quotient bits (hence fewer division steps DIVQ) if such a high degree of precision is not required.

I claim:

1. Device for the digital performance of an operation for the division of a dividend by a divisor according to a method of the type with non-restoration of partial remainders, comprising:

an arithmetic and logic unit to carry out the computation of the partial remainders, a circuit for the detection of null partial remainders during the division, an accumulator that is initialized with the dividend and that then contains, for each division step, the remainder on the most significant bits and the quotient on the least significant bits, a condition register (RC) containing information bits on the last arithmetic or logic operation performed, a source register (Reg) at the right-hand operand input ($Op_1$) of the arithmetic and logic unit to contain the n bits of the divisor wherein the device comprises a shift register at the left-hand operand input ($Op_2$) of the arithmetic and logic unit to obtain a leftward shift by one position of the contents of the accumulator and a multiplexer (2) to provide, at the first step of computation of the quotient (DIVS), a bit for the comparison of the signs of the divisor and of the dividend ($CS_1$), stored in a bit (CS) of the condition register and representing the sign bit of the quotient, and to provide, as the least significant bit ($g_0$) of the left-hand operand at the following steps of computation of the quotient (DIVQ), a complemented quotient bit (NQ) computed at the preceding step i–1 and memorized in the condition register, that represents the least significant bit of the quotient at the step i of the computation of the quotient, and wherein at each step of computation of the quotient, a zero detection bit computed by the circuit for the detection of null partial remainders is updated in a bit (Z) of the condition register.

2. Device according to claim 1, wherein the circuit for the detection of null partial remainders comprises a first combinational circuit to compute a zero detection bit at each division step i to re-update a bit (Z) of the condition register, in such a way that this bit computed at the step i is equal to 1 if all the bits $b_{16}$ to $b_{31}$ and the bit $b_{15}$ of the result contained in the accumulator are null or if the detection bit computed at the preceding step i–1 and memorized (Z) in the condition register and the bit $b_{15}$ are null.

3. Device according to claim 2, comprising a circuit for the correction of the quotient that comprises a first combinational circuit to compute a correction bit ($Cs_2$) of the quotient, in such a way that this bit ($Cs_2$) is equal to 1 if the divisor is negative (Sdiv=1) and there has been a detection of an entirely null remainder (Z=1) or if there has not been any entirely null remainder detected (!Z=1) but the divisor and the dividend have different signs (CS=$CS_1$=1) and a multiplexer (MUX) to apply the error correction bit as an input carry bit (Cin) to the arithmetic and logic unit.

4. Device according to claim 3, wherein the correction bit is then memorized in a bit (CS) of the condition register and wherein a bit indicating whether all the bits b0 to b15 of the corrected quotient are null is memorized in the condition register to establish the way in which the partial remainder must be corrected.

* * * * *